Figure 1:
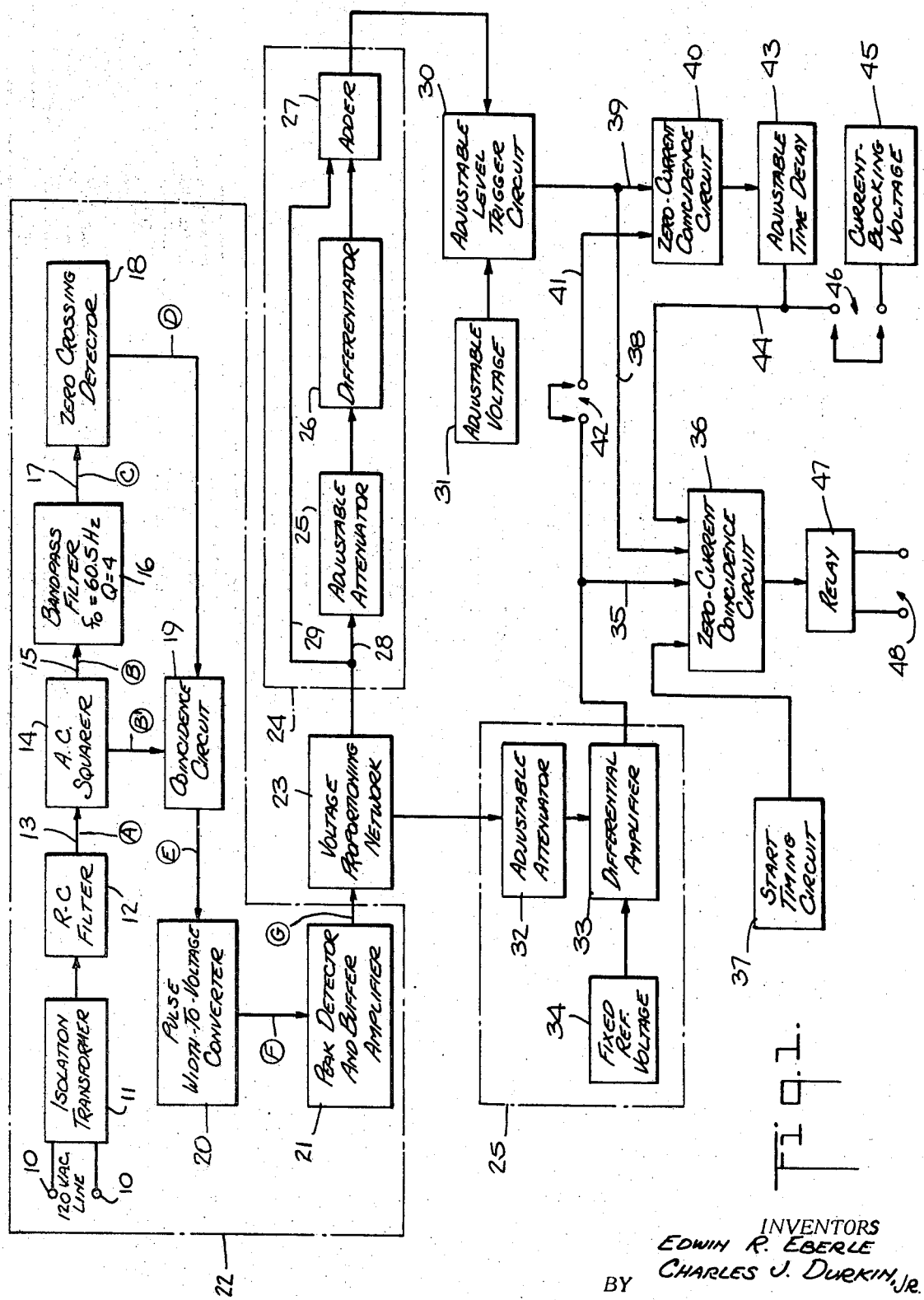

United States Patent

[11] 3,564,275

[72] Inventors Edwin R. Eberle
Great Neck,
Charles J. Durkin, Jr., Yorktown Heights, N.Y.
[21] Appl. No. 826,844
[22] Filed May 22, 1969
[45] Patented Feb. 16, 1971
[73] Assignee Consolidated Edison Company of New York, Inc. New York, N.Y.
a corporation of New York

[54] FREQUENCY-RESPONSIVE CONTROL CIRCUIT
19 Claims, 3 Drawing Figs.
[52] U.S. Cl. ................................................. 307/29;
307/87; 321/4
[51] Int. Cl. ..................................................... H02j 3/00
[50] Field of Search........................................... 307/29, 57,
87, 129; 321/4, 6; 317/26, 147

[56] References Cited
UNITED STATES PATENTS
| | | | |
|---|---|---|---|
| 2,933,615 | 4/1960 | Brown............................ | 307/57 |
| 2,998,551 | 8/1961 | Moakler.......................... | 307/129X |
| 3,172,017 | 3/1965 | Moakler.......................... | 307/129X |
| 3,271,580 | 9/1966 | Pope................................. | 307/29 |
| 3,277,307 | 10/1966 | Smeton, Jr., et al. ......... | (317)/(147) |
| 3,300,648 | 1/1967 | Rockefeller, Jr., et al. ... | 307/29 |
| 3,422,276 | 1/1969 | Sullivan........................... | 307/29 |

*Primary Examiner*—William M. Shoop, Jr.
*Attorney*—Ward, McElhannon, Brooks & Fitzpatrick ABSTRACT: Phase shift caused by a band-pass filter is employed for providing a voltage proportional to the deviation in frequency of an input signal from a reference level. This arrangement is incorporated in a relay control circuit for an electric power network load shedding system which includes an adjustable level trigger circuit for establishing the flat tripping frequency, an adjustable differential amplifier circuit for establishing an inhibit frequency, and a rate circuit for advancing the tripping frequency as a function of the rate at which system frequency drops. An adjustable time delay circuit prevents the relay from operating in response to transients.

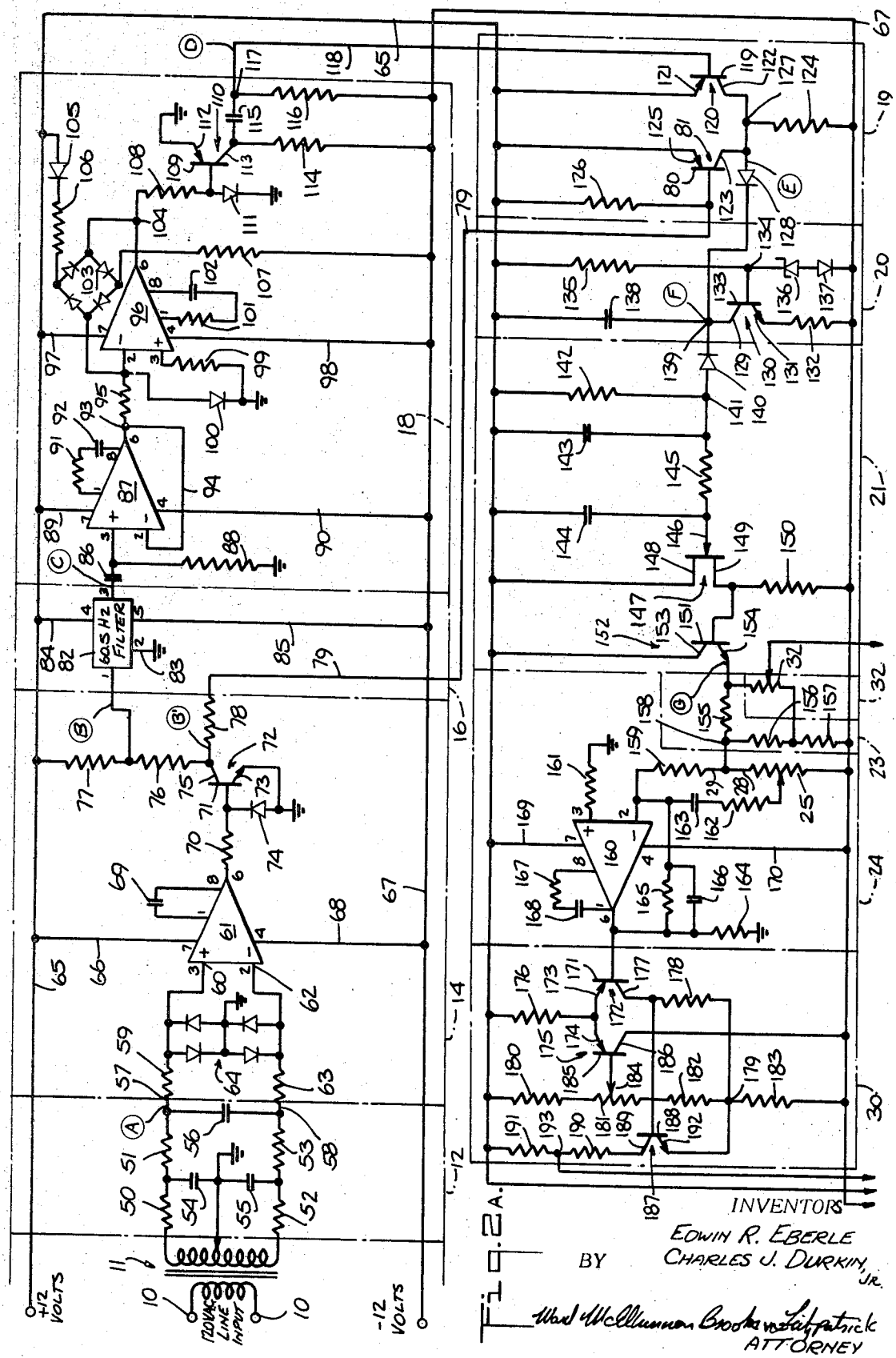

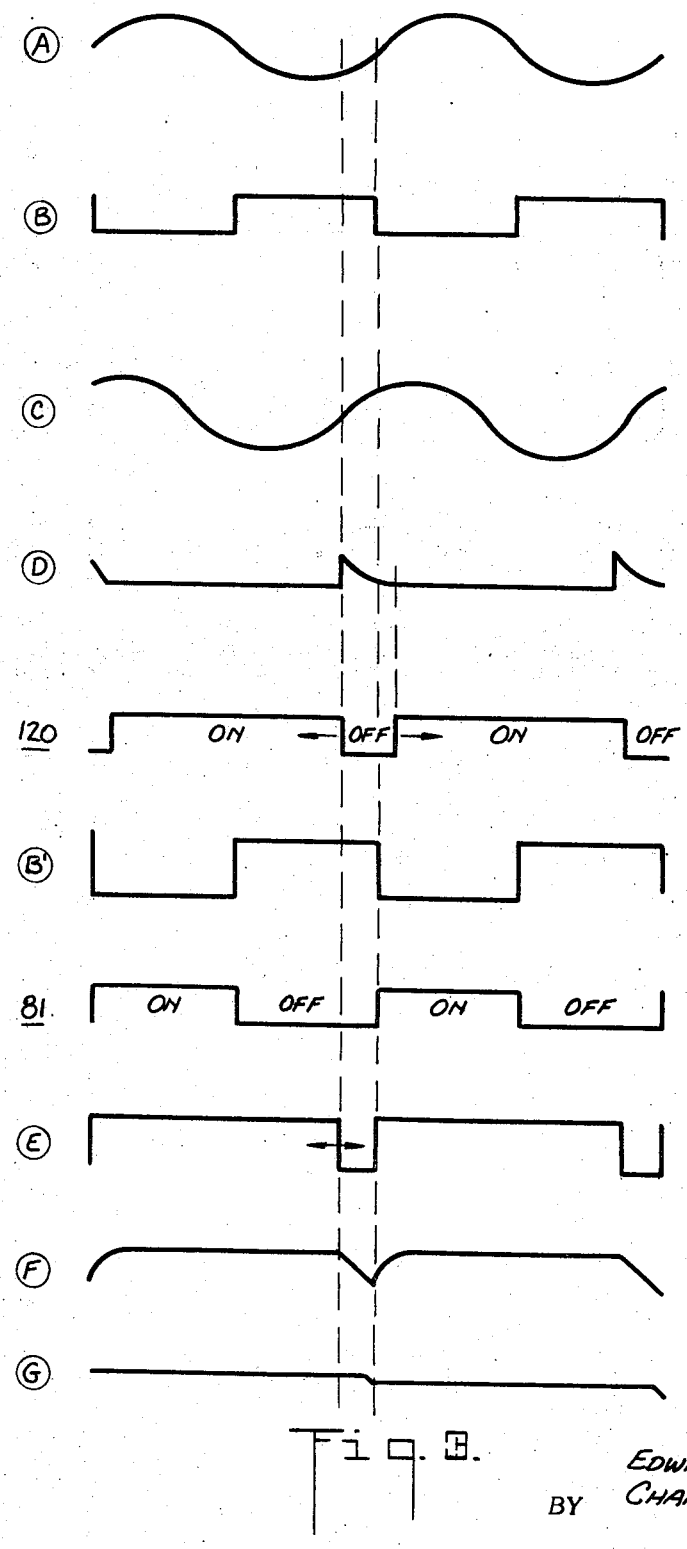

FREQUENCY-RESPONSIVE CONTROL CIRCUIT

The present invention relates to a frequency-responsive control circuit. More particularly, it relates to a control circuit capable of operating a relay or other control device for circuit supervision and the like.

There are numerous situations wherein the need arises for a circuit capable of sensing small changes in frequency of an AC voltage and providing a signal voltage varying in proportion thereto. For instance, it is known that where an electric power network becomes overloaded there is a tendency for the system frequency to drop due to the generating equipment gradually losing speed. Recent major power interruptions have highlighted the need for a reliable and accurate control for detecting the onset of conditions which if not halted would result in a major interruption.

Heretofore, attempts have been made to produce relays capable of detecting decreases in frequency caused by an incipient catastrophic condition in a power network; however, such attempts have not proven completely satisfactory. In most instances, unsuitable compromises have had to be made in selecting the trip points for such relays which result in interruption of a circuit in the face of certain transient effects within the power network not associated with a catastrophic situation.

It is, therefore, an object of the present invention to provide a frequency responsive control circuit and relay for a load-shedding system of an electric power network which is highly flexible in its adjustment, and both reliable and precise in its operation.

A further object of the invention is to provide such a frequency-responsive network as can be adjusted for coordinate use with protective devices at other locations.

Another object of the invention is to provide a unique arrangement for detecting slight changes in frequency and converting such changes into proportional voltage changes.

In accordance with one aspect of the invention, there is provided a frequency-responsive control circuit for a load-shedding system of an electric power network which comprises in combination means responsive to the frequency of the voltage in the power network for providing a variable voltage signal whose magnitude varies as a function of the decrease in the frequency from a given reference frequency, means responsive to the voltage signal for providing an intermediate signal which is a function of the sum of the instantaneous magnitude of the voltage signal and the first derivative thereof, means responsive to the intermediate signal for providing a first control signal when the intermediate signal exceeds a first given magnitude, means responsive to the voltage signal for providing a second control signal when the voltage signal exceeds a second control signal when the voltage signal exceeds a second given magnitude, and means responsive only to the simultaneous receipt of both the first and second control signals for providing an output signal to operate the load-shedding system, the second given magnitude corresponding to a first frequency below the reference frequency above which load-shedding is to be prevented, and the first given magnitude corresponding to a frequency lower than the first frequency and below which load-shedding must occur.

In accordance with a further aspect of the invention, there is provided a frequency-responsive circuit for converting an input signal of variable frequency into a variable voltage signal with the voltage varying as a function of the departure of the frequency of the input signal from a given reference frequency, the circuit comprising in combination means responsive to the input signal for providing an auxiliary signal shifted in phase an amount proportional to the departure of the frequency of the input signal from the reference frequency, and means for comparing the auxiliary signal with the input signal to provide the voltage signal proportional to the phase shift.

Figure 2B:
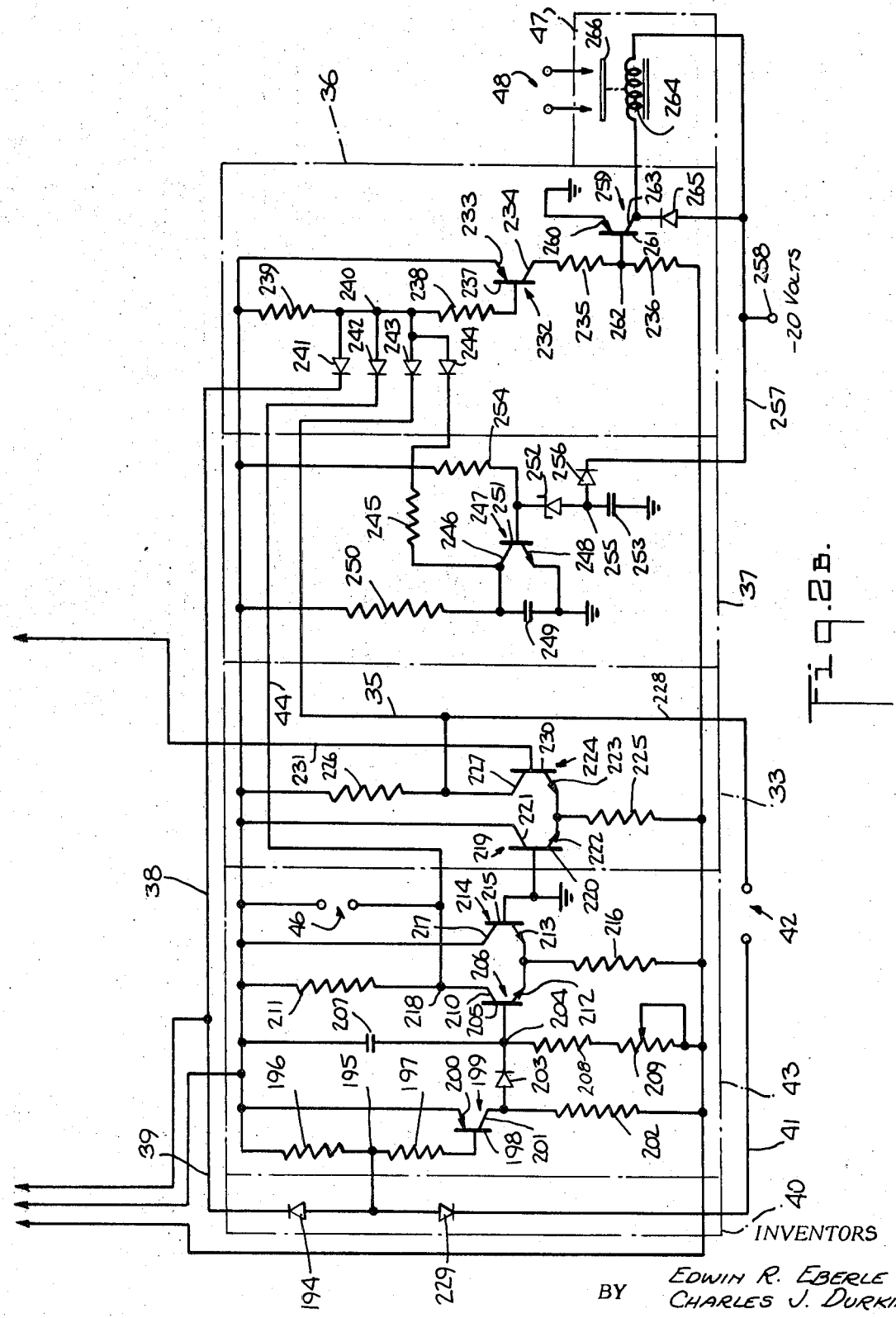

The invention will be better understood after reading the following detailed description of a presently preferred embodiment thereof with reference to the appended drawings in which:

FIG. 1 is a block diagram of a complete frequency responsive relay control circuit constructed in accordance with the invention;

FIGS. 2A and 2B constitute collectively a schematic circuit diagram of the system shown in block form in FIG. 1; and FIG. 3 is a series of wave shape diagrams for explaining the operation of the control circuit shown in FIGS. 1, 2A and 2B.

The same reference numerals are used throughout the several FIGS. of the drawings to designate the same or similar parts.

Referring to FIG. 1, the input signal is here shown as a 120-volt AC line voltage. It is applied to the input terminals 10 of an isolation transformer 11, and from the transformer through an R-C filter 12. The purpose of the filter 12 is to eliminate and reject harmonic distortion and transients. If it is assumed that the subject control circuit is intended for supervising the load-shedding equipment in a 60 Hz. electric power network, the R-C filter 12 should have a nominal cutoff frequency of about 60 Hz. A slightly lower cutoff frequency than 60 Hz. may actually be preferred in order to insure that no transients and harmonics are passed on to the subsequent sections of the circuit. Thus, a pure sinusoidal signal at the frequency of the power lines, represented by the wave shape A in FIG. 3, will appear on the connection 13 leading to an input of an AC squarer circuit 14.

The AC squarer 14 provides a first square wave output B (see FIG. 3) on path 15 which leads to an input of a band-pass filter 16. The filter 16 has a center frequency of 60.5 Hz. and a Q equal to 4. The center frequency of filter 16 corresponds to the reference frequency mentioned above. The Q of this filter should be selected such that the voltage at its output 17 (wave shape C in FIG. 3) is shifted in phase an amount proportional to the departure of the frequency from the center frequency of the filter. For proper operation of the circuit, the phase shift should be linearly proportional to the frequency deviation.

The auxiliary signal supplied by the filter 16 at its output 17 is applied to a zero crossing detector 18. The output from the zero crossing detector represented by the wave shape D is applied as a gating signal to one input of a coincidence circuit 19. The other input signal is obtained from the AC squarer 14 and is represented by the wave shape B'.

Coincidence circuit 19 provides an output signal represented by the wave shape E which is applied to a pulse width-to-voltage converter 20. This converter provides a variable voltage represented by the wave shape F which is fed to the peak detector and buffer amplifier 21.

All of the components described to this point may be considered as constituting a frequency-to-voltage converter and are shown within the broken line box 22. The output from the frequency-to-voltage converter is obtained from the peak detector and buffer amplifier 21 in the form of a variable voltage signal having a wave shape G. This wave or signal is applied to a voltage-proportioning network 23.

The voltage proportioning network 23 has two outputs, one of which connects with a rate circuit shown within the broken line box 24 while the other connects with an "inhibit" circuit shown within the broken line box 25. The rate circuit 24 includes an adjustable attenuator 25, a differentiator 26, and an adder 27. As shown, the signal obtained from the voltage-proportioning network 23 is applied over a path 28 to the adjustable attenuator and over a path 29 directly to one input of the adder 27. The adjustable attenuator has an output connected to the input of the differentiator 26 while the differentiator has an output connected to a second input of the adder 27. The output from the adder 27 is connected to an adjustable level trigger circuit 30. An adjustable voltage source 31 connected to the adjustable level trigger circuit 30 establishes the trigger level for such circuit.

The "inhibit" circuit includes another adjustable attenuator 32, a differential amplifier 33, and a fixed reference voltage source 34. The fixed reference voltage 34 is applied to one input of the differential amplifier 33 whose other input is supplied by the output from the adjustable attenuator 32. The output from the differential amplifier 33 is connected over a path 35 to one input of a zero-current coincidence circuit 36. A second input of the circuit 36 is coupled to an output of a start timing circuit 37. A third input of the circuit 36 is coupled over a path 38 to an output of the adjustable level trigger circuit 30. The output from the circuit 30 is also connected over a path 39 to one input of a zero-current coincidence circuit 40. Another input of the circuit 40 is connected over a path 41, which includes a strap connectable circuit interruption 42, to the output from the differential amplifier 33. The coincidence circuit 40 has an output connected to an adjustable time delay circuit 43. The output from the time delay circuit 43 is connected over a path 44 to a still further input of the coincidence circuit 36. A source of current-blocking voltage 45 is connected through another strap connectable interruption 46 to the connection 44 between the adjustable time delay 43 and coincidence circuit 36. The output from coincidence circuit 36 is connected to a relay 47 having output terminals 48.

Reference should now be had to FIGS. 2A and 2B for a detailed description of the circuit employed in the system of FIG. 1. The line voltage is applied through the transformer 11 to the R-C filter 12 which consists of the resistors 50, 51, 52, 53, and capacitors 54, 55, 56, interconnected as shown. A double-ended output is obtained in known manner at points 57 and 58.

Point 57 is connected through a resistor 59 to the direct input 60 of an operational amplifier 61. The indirect input 62 of the operational amplifier 61 is connected through resistor 63 to the point 58. A network of unidirectional devices or diodes 64 is connected in known manner across the input to the operational amplifier 61 for limiting the voltage applied to its input and for providing initial rough squaring of the input sinusoidal wave.

Operating voltage for the operational amplifier 61 is obtained from a positive 12-volt bus 65 over a connection 66 and from a minus 12-volt bus 67 over a connection 68. A capacitor 69 is connected in a conventional frequency compensating external feedback loop. The small numbers adjacent the various connections to the operational amplifier represent the terminal designations for the particular amplifier employed. The actual model type and component values will be given in a table at the end of this description.

The output from the operational amplifier 61 is connected through a resistor 70 to the base electrode 71 of an NPN transistor 72. The emitter electrode 73 of transistor 72 is connected to ground. A negative-voltage-limiting diode 74 is connected as shown between ground and the base electrode 71.

The collector electrode 75 of transistor 72 is connected through resistors 76 and 77 in series to the positive voltage bus 65. The junction between resistors 76 and 77 is connected to the lead 15 leading to the input of filter 16. A further connection leads from collector electrode 75 through resistor 78 to a conductor 79 leading to the base electrode 80 of a PNP transistor 81 in the coincidence circuit 19.

The filter 16 is shown as an active filter element 82 having a ground connection 83 and voltage supplied from the positive and negative buses 65 and 67 over connections 84 and 85, respectively. Again, the small numbers adjacent the leads correspond to the commercial terminal designations.

The output from the filter 82 is connected over lead 17 through a condenser 86 to the direct input of an operational amplifier 87. A resistor 88 is connected between ground and the junction between capacitor 86 and the direct input of the amplifier 87.

Operational amplifier 87 is supplied with operating voltage over connections 89 and 90 from the positive and negative buses 65 and 67, respectively. A resistor 91 and capacitor 92 are connected in series for frequency compensation in the usual external feedback path. A direct feedback is provided from the main output of the operational amplifier at terminal 93 to its indirect input terminal over a path 94. Output terminal 93 is connected through a resistor 95 to the indirect input of another operational amplifier 96. Operating current for the amplifier 96 is supplied from the bus 65 over connection 97 and from the bus 67 over connection 98. The direct input of amplifier 96 is connected to ground through a resistor 99. A diode 100 is connected between ground and the indirect input of amplifier 96 poled as shown. External resistor 101 and capacitor 102 connected in series to the amplifier 96 provides the usual frequency compensation. A rectifier bridge 103 is connected as shown between the output terminal 104 of amplifier 96 and its indirect input terminal. Voltage for establishing a stable operating point for the bridge 103 is obtained by the path which includes diode 105, resistor 106, and resistor 107.

The output terminal 104 of operational amplifier 96 is connected through a resistor 108 to the base electrode 109 of a PNP transistor 110. The base electrode 109 is also connected through a diode 111 to ground. The emitter electrode 112 of transistor 110 is connected to ground while the collector electrode 113 is connected through a resistor 114 to the negative bus 67. The collector electrode 113 is also connected through a capacitor 115 and another resistor 116 to the negative bus 67. The junction between capacitor 115 and resistor 116 provides an output 117 for the zero crossing detector 18 which is connected over a path 118 to the base electrode 119 of a PNP transistor 120 in the coincidence circuit 19.

Transistor 120 has its emitter electrode 121 connected to the positive bus 65 and its collector electrode 122 joined to the collector electrode 123 of transistor 81 and connected through resistor 124 to the negative bus 67. Transistor 81 has an emitter electrode 125 connected directly to the positive bus 65. A resistor 126 connects the positive bus 65 to the base electrode 80 of transistor 81. The junction 127 between the resistor 124 and the two collector electrodes 122 and 123 is connected through a diode 128 in the anode-to-cathode direction to the collector electrode 129 of an NPN transistor 130 in the pulse width-to-voltage converter 20.

The transistor 130 has its emitter electrode 131 connected to the negative bus 67 through a resistor 132. The base electrode 133 of transistor 130 is connected to a junction 134 which is connected, on the one hand, through a resistor 135 to the positive bus 65 and, on the other hand, through a Zener diode 136 and a standard diode 137, in series, to the negative bus 67. A capacitor 138 is connected between the positive bus 65 and the junction 139 between the diode 128 and the collector electrode 129. Junction 139 may be considered both the input and output point of the converter 20.

The output of the converter 20 at junction 139 is connected through a diode 140 in the cathode-to-anode direction to a junction 141. A resistor 142 in parallel with a capacitor 143 is connected between the positive bus 65 and the junction 141. A further capacitor 144 is connected in series with a resistor 145 between the positive bus 65 and junction 141. The junction between capacitor 144 and resistor 145 is connected to the gate 146 of a field effect junction transistor 147. The source electrode 148 is connected to the positive bus 65 while the drain electrode 149 is connected through a resistor 150 to the negative bus 67. The drain electrode 149 is also connected to the base electrode 151 of an NPN transistor 152 having its collector electrode 153 connected to the positive bus 65.

The emitter electrode 154 of transistor 152 provides the output connection from the peak detector and buffer amplifier 21. It is connected through the voltage-proportioning network 23 consisting of three series connected resistors 155, 156, and 157 to the negative bus 67. The resistance element of the adjustable attenuator 32 is connected in parallel with the two resistors 155 and 156; that is, it is connected between the emitter electrode 154 and the junction between resistors 156 and 157. The output from the voltage-proportioning network which leads to the rate circuit 24 is obtained from the junction 158 between the resistors 155 and 156.

As shown, the junction 158 is connected to both the paths 28 and 29. Path 28 is connected through the resistance element of adjustable attenuator 25 to the negative bus 67. Path 29 is connected through a resistor 159 to the indirect input of an operational amplifier 160. The direct input of operational amplifier 160 is connected to ground through a resistor 161. A parallel input connection for the operational amplifier is provided by the resistor 162 in series with the capacitor 163 between the slider of attenuator 25 and the indirect input of the operational amplifier. The output terminal of the operational amplifier 160 is connected both to ground through a resistor 164, and through resistor 165 in parallel with capacitor 166 to its indirect input. Frequency compensation for the operational amplifier 160 is provided by resistor 167 in series with capacitor 168 in the conventional manner. Voltage for operating the operational amplifier is obtained from the positive bus 65 over a connection 169 and from the negative bus 67 over a connection 170.

The output from the operational amplifier 160 which represents the output from the rate circuit 24 is connected directly to the base electrode 171 of a PNP transistor 172. The emitter electrode 173 of transistor 172 is connected to the emitter electrode 174 of a second PNP transistor 175. A resistor 176 connects the positive bus 65 to both emitter electrodes 173 and 174. The collector electrode 177 of transistor 172 is connected through a resistor 178 to a junction 179 on a voltage divider consisting of the series arrangement of resistor 180, potentiometer resistance element 181, resistor 182 and resistor 183. The voltage divider is connected between the positive and negative buses 65 and 67, respectively. Potentiometer resistance element 181 is associated with a slider 184 which is connected to the base electrode 184 of transistor 175. Transistor 175 has its collector electrode 186 connected directly to the negative bus 67. Another transistor 187 of the NPN type has its base electrode 188 connected directly to the collector electrode 177 of transistor 172. The collector electrode 189 of transistor 187 is connected through resistors 190 and 191 in series to the positive bus 65. The emitter electrode 192 of transistor 187 is connected directly to the junction 179 on the voltage divider. Transistors 172, 175 and 187 with their associated circuitry constitute the adjustable level trigger circuit 30.

The output from trigger circuit 30 is obtained from a junction 193 between the resistors 190 and 191. Junction 193 is connected over the path 39 to the cathode of a diode 194 in the a zero-current coincidence circuit 40. The anode of diode 194 is connected to the junction 195 between resistors 196 and 197 in the adjustable time delay circuit 43. The resistors 196 and 197 are connected between the positive bus 65 and the base electrode 198 of PNP transistor 199. The emitter electrode 200 of transistor 199 is directly connected to the positive bus 65. The collector electrode 201 of transistor 199 is connected through a resistor 202 to the negative bus 67. The collector electrode 201 is also connected through a diode 203 in the anode-to-cathode direction to a junction 204 which is joined to the base electrode 205 of an NPN transistor 206. A capacitor 207 is connected between the positive bus 65 and the junction 204. A fixed resistor 208 in series with an adjustable resistor 209 is connected between the junction 204 and the negative bus 67.

Transistor 206 has a collector electrode 210 connected through a resistor 211 to the positive bus 65. An emitter electrode 212 of transistor 206 is connected to an emitter electrode 213 of another NPN transistor 214 having its base electrode 215 connected directly to ground. The junction between the emitter electrodes 212 and 213 is connected through a resistor 216 to the negative bus 67. Transistor 214 has a collector electrode 217 connected directly to the positive bus 65. The junction 218 between resistor 211 and collector electrode 210 is connected to the path 44, as shown. The spaced contacts 46 are connected between the positive bus 65 and the path 44.

The differential amplifier 33 includes an NPN transistor 219 having its base electrode 220 connected to ground, its collector electrode 221 connected directly to the positive bus 65, and its emitter electrode 222 connected to the emitter electrode 223 of another NPN transistor 224. The junction between the emitter electrodes 222 and 223 is connected through a resistor 225 to the negative bus 67. A resistor 226 connects the positive bus 65 to the collector electrode 227 of transistor 224. The junction between resistor 226 and collector electrode 227 is connected to path 35 which leads to the zero-current coincidence circuit 36. It is also connected by way of path 228 and spaced terminals 42 through a diode 229 in the cathode-to-anode direction to the junction 195. The transistor 224 has a base electrode 230 connected over a path 231 to the slider of adjustable attenuator 32.

The zero-current coincidence circuit 36 includes a PNP transistor 232 having an emitter electrode 233 connected to the positive bus 65 and a collector electrode 234 connected through series resistors 235 and 236 to the negative bus 65. The junction 240 between the resistors 238 and 239 is connected in parallel to the anodes of four diodes, 241, 242, 243 and 244. The cathode of diode 241 is connected to path 38. The cathode of diode 242 is connected to path 44. The cathode of diode 243 is connected to path 35. The cathode of diode 244 is connected through a resistor 245 in the start timing circuit 37 to the collector electrode 146 of an NPN transistor 247 having its emitter electrode 248 connected to ground. A capacitor 249 is connected between the collector electrode 246 and ground, as shown. A resistor 250 is connected between the positive bus 65 and the junction between capacitor 249 and collector electrode 246. Transistor 247 has a base electrode 251 connected through a Zener diode 252 in series with a capacitor 253 to ground. The base electrode 251 of transistor 247 is also connected through a resistor 254 to the positive bus 65. The junction 255 between Zener diode 252 and capacitor 253 is connected through a diode 256 in the anode-to-cathode direction to the bus 257 which is connected to a terminal 258. As indicated in the drawing, − 20 volts is applied to the terminal 258 relative to a ground. Preferably, this voltage is a full wave rectified AC voltage obtained from an unfiltered point in the power supply for the various components of the circuit. The purpose for using unfiltered voltage will be apparent from the discussion to follow.

A PNP transistor 259 has its emitter electrode 260 connected to ground and its base electrode 261 connected to the junction 262 between resistors 235 and 236. The collector electrode 263 of transistor 259 is connected through the solenoid winding 264 of the relay 47 of to the − 20-volt bus 257. In addition, a diode 265 is connected in the anode-to-cathode cathode direction between the bus 257 and the collector electrode 263 of transistor 259. The armature of relay 47 is symbolically represented by the bar 266. As shown, relay 47 is open circuited when deenergized.

The details of the circuit having been described, its operation may now be considered. Refer first to the zero-current coincidence circuit 36. So long as current is flowing through any one of the diodes 241, 242, 243, and 244, the voltage at the base electrode 237 of transistor 232 will be sufficiently below the voltage at its emitter electrode 233 as to render transistor 232 conductive. This will cause the voltage at junction 262 to be slightly positive with respect to ground causing transistor 259 to be rendered nonconductive. With transistor 259 nonconductive the relay 57 is deenergized and its contacts coupled to output terminals 48 are open.

When power is initially applied to the circuit, current will flow through diode 244 and resistor 245 tending to charge capacitor 249. Charging current for capacitor 249 is also supplied through resistor 250. However, resistor 245 is chosen smaller than resistor 250 such that the initial charging current flows primarily through diode 244. After approximately 0.5 seconds, the voltage across capacitor 249 will have risen sufficiently to block conduction through diode 244. However, charging current will continue to flow through resistor 250 until capacitor 249 is charged to the full voltage between the positive bus 65 and ground. Assuming that there is no interruption or appreciable drop in supply voltage, the charge on capacitor 249 will remain at the + 12-volt level of the voltage applied to bus 65 and diode 244 will remain nonconducting.

It was mentioned that the voltage applied to terminal 258 is unfiltered. This is preferably − 20 volts R.M.S. with a − 30-volt peak value. When the power supply is energized the capacitor 253 will be quickly charged through diode 256 from the supply voltage at terminal 258 such that the voltage at junction 255 is approximately 30 volts negative with respect to ground. The resistor 254 and Zener diode 252 now form a voltage divider between the positive bus 65 and the negative point 255. When point 255 is at the − 30-volt level the potential at the base electrode 251 of transistor 247 will be below ground potential. This maintains transistor 247 in a nonconductive condition.

If the input voltage to the power supply powering the control circuit should drop below, say, 70 volts, when 110 volts is a nominal operating level, the peak negative excursions of the voltage applied to terminal 258 will be insufficient to keep the potential at the base electrode 251 sufficiently negative to maintain transistor 247 nonconductive. When transistor 247 commences conduction, it discharges condenser 249 and draws current through diode 244 to prevent transistor 232 from being rendered nonconductive and thereby energizing relay 47. That is, relay 47 cannot be energized if the supply voltage powering the circuit drops below a predetermined design level. Such design level should be determined by the stability characteristics of the remaining circuitry. When the voltage drops to the point that the regulation of the power supplies is no longer adequate to maintain accurate operation of the system, it is essential that the relay be disabled. Of course, if there is a total loss of voltage the condenser 249 will be discharged through the transistor 247 such as to reset the start timing circuit 37.

Assume, now, that power has been applied to the circuit and line voltage is also applied to the terminals 10. As mentioned above, a pure sinusoidal signal at the frequency of the power lines will appear at the input of the AC squarer circuit 14; that is, at its input points 57 and 58. The operational amplifier 61 is connected as a high gain differential amplifier which essentially converts the sinusoidal signal from the filter 12 to a square wave. The final squaring is produced by the switching characteristic of transistor 72 and its associated circuitry. The wave shapes B and B' at the output of the AC squarer 14 will have a rise and fall time of less than 1 microsecond.

The output on path 15 from AC squarer 14 is reconverted to a sine wave and shifted in phase by the filter 16, as explained previously. The phase-shifted sinusoidal wave, C, is applied to the zero crossing detector 18. In this circuit the sinusoidal input is first converted to a synchronized square wave and then to a gating pulse. The operational amplifier 87 functions as a unity gain buffer amplifier and provides impedance matching with the output of filter 16. It should be observed that amplifier 87 is connected so that its output wave is in phase with the input signal. The output from operational amplifier 87 is now applied to the operational amplifier 96 which is connected to function as a high sensitivity zero detector. The diode bridge network increases the rise time of the square wave pulse by delaying the feedback until the output voltage exceeds a predetermined level. This circuit is designed to cause the voltage at terminal 104 to shift sharply between plus and − 2 volts, but because the indirect input of operational amplifier 96 is driven there is a 180° phase shift in its output at terminal 104.

Transistor 110 is connected such that it becomes conductive when the potential at its base electrode is below ground and becomes nonconductive when the potential at its base electrode is above ground. Thus, it switches rapidly in response to the square wave input derived from operational amplifier 96 causing a 12-volt square wave to appear at its collector electrode 113. This wave is differentiated by the R-C network consisting of capacitor 115 and resistor 116, resulting in a gating pulse having the general configuration shown in wave shape D of FIG. 3 being applied to the base electrode 119 of transistor 120. It will be understood that the negative going portions of the wave at collector electrode 113 are suppressed by conduction between the emitter 121 and the base electrode 119 of transistor 120. The time constant of the R-C network mentioned above is such that the gating pulse in wave shape D has a duration of approximately 2,000 microseconds. Comparing wave shapes C and D, it should be noted that the vertical or leading edge of the gating pulse of wave D coincides with the instant that the sine wave C passes through zero in the negative to positive direction. This represents the instant at which transistor 110 is rendered conductive.

For the duration of the gating pulse applied to its base electrode 119, the transistor 120 will be rendered nonconductive. The current conducted by transistor 120 is shown by the similarly labeled wave shape in FIG. 3. Simultaneously, transistor 81 is caused to switch between the conductive and nonconductive state by reason of the signal applied to its base electrode 80 from the AC squarer circuit 14. With the voltage being as represented by wave shape B' in FIG. 3, transistor 81 will conduct current as shown by the correspondingly labeled wave shape below the wave B'.

Since the leading edge of the gating pulse depends upon the zero crossing point of the phase shifted signal shown in wave C, the off period of transistor 120 will shift in phase or time correspondingly as shown by the arrows on the wave shape in FIG. 3. By comparing this with the current wave for transistor 81, it will be seen that the extent of overlap between the off period of transistor 120 and the off period of transistor 81 will vary as a function of the shift in phase of wave C. Thus, the voltage at junction 127 common to the collector electrodes of transistors 81 and 120 will take the form shown in wave shape E of FIG. 3. The width of the negative going pulse will depend upon the above-mentioned overlap between the off conditions of transistors 81 and 120.

So long as either transistor 81 or transistor 120 is conductive a discharge path will be provided through diode 128 for condenser 138. Thus, during this period the voltage at junction 139 will remain close to the level of the voltage on the positive bus 65. However, when both transistors 81 and 120 become nonconductive during the period of the negative pulse in wave E, condenser 138 will be charged through the constant current source provided by transistor 130 in conjunction with the Zener diode 136 stabilizing the bias on its base electrode 130. It should now be apparent that the magnitude of the voltage developed at junction 139 will depend upon the duration of the off condition of transistors 81 and 120; that is, the width of the negative going pulse of wave E.

The maximum amplitude of the voltage developed at junction 139 will be detected in known manner by the peak detector and buffer amplifier circuit 21. Thus, a wave having the general shape of that shown in line G of FIG. 3 will be applied to the voltage proportioning network 23 and from there to the rate circuit 24. Operation of the rate circuit should be apparent in view of the diagrammatic representation in FIG. 1. It is noted that resistor 162 and capacitor 166 are provided to limit the high frequency response of the circuit. The operation of the rate circuit 24 may be defined in terms of the following equation:

$$E_{out} = -\left(AE_{in} + B\frac{d}{dt}E_{in}\right)$$

wherein the values of the coefficients $A$ and $B$ are determined by the circuit components with the $B$ term being primarily a function of the position of the slider of adjustable attenuator 25. Although the input voltage swings negative from the positive voltage of bus 65 as the input frequency decreases, the output voltage from the rate circuit will vary in the opposite direction due to the polarity reversal therein.

Referring to the adjustable level trigger circuit 30, the transistors 172, 175 and 187 are connected in a modified Schmitt Trigger configuration. The pulse width-to-voltage converter 20 in combination with the peak detector and buffer amplifier 21 has a response time of about 170 milliseconds and yield a DC signal with negligible ripple. The arrangement is such that the voltage at the output of the peak detector and buffer amplifier 21 changes about 4 volts for each hertz drop in frequency of the input signal at terminal 10. Thus, when the input frequency is 60.5 Hz., the voltage at the emitter electrode 154 of transistor 152 will be approximately plus 12 volts. When the frequency has dropped to 59.5 Hz. the voltage at the emitter electrode 154 will have dropped to about +8 volts.

With maximum positive voltage at the input to rate circuit 24 the voltage applied to the adjustable level trigger circuit at the output of the rate circuit 24 will be at its lowest value. Hence, transistor 172 will be conductive. It will be apparent that at the same time transistor 187 will be conductive while transistor 175 will be nonconductive. During typical operation, the slider 184 on potentiometer resistance element 181 will be adjusted to apply a voltage to the base electrode 185 of transistor 175 such that the condition of the circuit will change abruptly when the voltage applied to the base electrode 171 of transistor 172 corresponds to an input frequency of 59.0 Hz. With such setting, transistor 187 will remain conducting until the voltage supplied to the base electrode 171 of transistor 172 has exceeded a level corresponding to the frequency of 59.0 Hz. It should be remembered, however, that such condition develops when the frequency drops below and not above the set level.

The circuit 30 has slight hysteresis such that if it is adjusted to trip as the frequency drops below 59.0 Hz., it will not reset until the frequency rises above 59.1 Hz. In the preceding discussion when referring to the rise and fall of frequency it should be understood that what actually is involved is the rise and fall of voltage at the output of the rate circuit 24.

When transistor 187 is conducting it causes the voltage on leads 38 and 39 to be below the value of the voltage at the positive bus 65. It also causes current to flow through diode 241 in the zero-current coincidence circuit 36 and through the diode 194 in the zero-current coincidence circuit 40. By causing current to flow through diode 241 the adjustable level trigger circuit 30 maintains the relay 47 deenergized.

The flow of current through diode 194 causes the voltage at base electrode 198 of transistor 199 to assume a value below that of the positive bus 65 such that transistor 199 is rendered conductive. So long as transistor 199 is conducting it provides a discharge path through diode 203 for condenser 207.

For the moment assume that the interruption 42 is not bridged by a jumper. Therefore, diode 229 will be nonconducting. Hence, whenever the adjustable level trigger circuit 30 changes its condition such that transistor 187 is nonconducting, the voltage at the base electrode 198 of transistor 199 will be raised to its cutoff point. Commencing with cutoff of transistor 199 condenser 207 will start charging through resistors 208 and 209. Thus, the voltage at junction 204 will start dropping from the positive 12-volt level. When the voltage drops sufficiently, that is, below ground potential, the transistor 206 which was previously conducting will be rendered nonconducting. The actual voltage level at which this occurs depends upon the bias level established at the emitter electrode 212 by virtue of the conducting state of transistor 214 whose base electrode is connected to ground. In essence, transistors 206 and 214 are connected in a differential amplifier circuit.

While transistor 206 is conducting it draws current through diode 242 in the zero-current coincidence circuit 36. If a conductive strap is connected across the interruption 46 applying the full positive voltage to the cathode of diode 242 conduction therethrough will be interrupted and the adjustable delay circuit 43 will have been bypassed. Otherwise, it is necessary for transistor 206 in the adjustable time delay circuit 43 to become nonconductive before relay 47 can be energized. The nature of the time delay circuit 43 is such that it responds to a combination of pulse count and pulse duration from the zero-current coincidence circuit 40.

Now considering the differential amplifier 33, it will be observed that the transistor 219 has its base electrode connected to ground and, therefore, transistor 224 will be conducting so long as the voltage on its base electrode 230 is above ground potential. The voltage on base electrode 230 is determined by that appearing at the slider of adjustable attenuator 32. This voltage, in turn, depends upon the voltage output from the circuit 21 as proportioned by the voltage-proportioning network 23. As the input frequency decreases from its maximum value, the voltage at the base electrode 230 will also decrease. Therefore, at some lower frequency the transistor 224 will be rendered nonconducting. The level at which this occurs is adjustable by the adjustable attenuator 32 and may typically be set to correspond to a frequency of 59.5 Hz. In such case, so long as the frequency is above 59.5 Hz., the transistor 224 will be conducting drawing current through diode 243 in the zero-current coincidence circuit 36 preventing relay 47 from being energized.

If a conductive jumper is applied across the interruption 42, the diode 229 will be caused to conduct whenever transistor 224 in the differential amplifier 33 is conducting; that is, whenever the inhibit circuit 25 (see FIG. 1) is functioning to prevent energization of relay 47. Conduction of diode 229 prevents a charge from developing on capacitor 207 in the adjustable time delay circuit 43 in the same manner as conduction through diode 194. Therefore, when the interruption 42 is bridged it is necessary for conduction through both diodes 194 and 229 to be interrupted before the adjustable time delay circuit 43 commences operation.

It should now be apparent that adjustment of potentiometer 181 sets the flat frequency tripping point while adjustment of attenuator 32 sets the "inhibit" level. The flat trip point represents that frequency below which the relay 47 must be energized while the inhibit point represents that frequency above which the relay 47 cannot be energized.

In the following table, typical values are set forth for the various circuit constants found suitable in providing a control circuit for use with a 60 Hz. system. Both the flat frequency setting and the inhibit control setting is adjustable between 58 and 60 Hz. The time delay afforded by adjustable time delay circuit 43 is adjustable between about 80 and 250 milliseconds.

In the following tabulation the values of all resistors are in ohms where $K = x\ 10^3$ and $M = x\ 10^6$; and the values of all capacitors are in microfarads unless otherwise indicated. All diodes not listed are type 1N914A, while the four operational amplifiers are each Burr-Brown type 3053/01.

RESISTORS

| Ref. No. | Value | Ref. No. | Value | Ref. No. | Value |
|---|---|---|---|---|---|
| 50 | 33K | 124 | 47K | 183 | 100 |
| 51 | 33K | 126 | 10K | 190 | 10K |
| 52 | 33K | 132 | 2.0K [1] | 191 | 2.2K |
| 53 | 33K | 135 | 1.2K | 196 | 10K |
| 59 | 33K | 142 | 470K | 197 | 220 |
| 63 | 33K | 145 | 10M | 202 | 47K |
| 70 | 3.9K | 150 | 220K | 208 | 6.8K |
| 76 | 10K | 155 | 1.8K | 209 | 50K |
| 77 | 1.8K | 156 | 1.8K | 211 | 1K |
| 78 | 10K | 157 | 2K | 216 | 2.7K |
| 88 | 100K | 159 | 1.5M | 225 | 2.7K |
| 91 | 220 | 161 | 750K | 226 | 1K |
| 95 | 5.1K | 162 | 33K | 235 | 6.2K |
| 99 | 5.1K | 164 | 1K | 236 | 10K |
| 101 | 1,200 | 165 | 1.5M | 238 | 220 |
| 106 | 10K | 167 | 390 | 239 | 10K |
| 107 | 10K | 176 | 2.7K | 245 | 22K |
| 108 | 3.9K | 178 | 10K | 250 | 100K |
| 114 | 4.7K | 180 | 750 | 254 | 47K |
| 116 | 39K | 182 | 390 | | |

POTENTIOMETERS

| | | | | | |
|---|---|---|---|---|---|
| 25 | 10K | 32 | 5K | 181 | 1K |

CAPACITORS

| Ref. No. | Value | Ref. No. | Value | Ref. No. | Value |
|---|---|---|---|---|---|
| 54 | .05 | 102 | 0.001 | 166 | 0.022 |
| 55 | .05 | 115 | 0.25 | 168 | 0.0022 |
| 56 | .05 | 138 | 0.5 | 207 | 10 |
| 69 | 10 [2] | 143 | 0.05 | 249 | 10 |
| 86 | 0.5 | 144 | 0.005 | 253 | 0.25 |
| 92 | 0.005 | 163 | 1 | | |

[1] 1%.
[2] Mmfd.

DIODES

| Ref. No. | Type | Ref. No. | Type | Ref. No. | Type | Ref. No. | Type |
|---|---|---|---|---|---|---|---|
| 136 | 1N714 | 252 | 1N714A | 256 | 1N1696 | 265 | 1N1696 |
| 137 | 1N1692 | | | | | | |

TRANSISTORS

| Ref. No. | Type | Ref. No. | Type | Ref. No. | Type | Ref. No. | Type |
|---|---|---|---|---|---|---|---|
| 72 | 2N3391A | 147 | C680 | 199 | 2N3906 | 232 | 2N3906 |
| 81 | 2N3906 | 152 | 2N3391A | 206 | 2N1304 | 247 | 2N1304 |
| 110 | 2N3906 | 172 | 2N1305 | 214 | 2N1304 | 259 | 2N1039 |
| 120 | 2N3906 | 175 | 2N1305 | 219 | 2N3391A | | |
| 130 | 2N3391A | 187 | 2N3391A | 224 | 2N3391A | | |

MISCELLANEOUS

| Ref. No. | Identification |
|---|---|
| 11 | TRIAD F94X, Transformer. |
| 47 | Potter-Brumfield, Relay #JMI-112-11. |
| 82 | White Instruments Lab. #254, 60.5 Hz. filter. |

Having described in detail the presently preferred embodiment of the invention, it will be apparent to those skilled in the art that various changes may be made therein without departing from the true spirit of the invention as defined in the appended claims.

We claim:

1. A frequency-responsive control circuit comprising in combination means for converting an input signal of variable frequency into a variable voltage signal with the voltage varying as a function of the departure of the frequency of said input signal from a given reference frequency, means responsive to said voltage signal for providing an intermediate signal which is a function of the sum of the instantaneous magnitude of said voltage signal and the first derivative thereof, means responsive to said intermediate signal for providing a first control signal when said intermediate signal exceeds a first given magnitude, means responsive to said voltage signal for providing a second control signal when said voltage signal exceeds a second given magnitude, and means responsive only to the simultaneous receipt of both said first and second control signals for providing an output signal, said fist given magnitude corresponding to a greater departure of the frequency from said reference frequency than said second given magnitude.

2. A frequency-responsive control circuit for a load-shedding system of an electric power network comprising in combination means responsive to the frequency of the voltage in said power network for providing a variable voltage signal whose magnitude varies as a function of the decrease in said frequency from a given reference frequency, means responsive to said voltage signal for providing an intermediate signal which is a function of the sum of the instantaneous magnitude of said voltage signal and the first derivative thereof, means responsive to said intermediate signal for providing a first control signal when said intermediate signal exceeds a first given magnitude, means responsive to said voltage signal for providing a second control signal when said voltage signal exceeds a second given magnitude, and means responsive only to the simultaneous receipt of both said first and second control signals for providing an output signal to operate said load-shedding system, said second given magnitude corresponding to a first frequency below said reference frequency above which load-shedding is to be prevented, and said first given magnitude corresponding to a frequency lower than said first frequency and below which load-shedding must occur.

3. A control circuit according to claim 2, wherein said means for providing said first control signal includes time delay means for providing said first control signal only if and after said intermediate signal exceeds said first given magnitude for a time at least equal to the delay afforded by said time delay means.

4. A control circuit according to claim 3, wherein means are provided for selectably bypassing said time delay means.

5. A control circuit according to claim 2, wherein said means for providing said first control signal comprises coincidence circuit means, level-determining means interconnecting said means for providing an intermediate signal with said coincidence circuit means for applying a signal to the latter means when said intermediate signal exceeds said first given magnitude, selectably operable circuit means for interconnecting the means for providing a second control signal with said coincidence circuit means for applying to the latter means said second control signal when said selectably operable means is operative, and means interconnecting an output of said coincidence circuit means with said means for providing an output signal to apply thereto said first control signal, said coincidence circuit means being operable to provide said first control signal upon receipt of said signal from said level-determining means when said selectably operable circuit means is inoperative and upon simultaneous receipt of said second control signal when said selectably operable circuit means is operative.

6. A control circuit according to claim 5, wherein said means interconnecting an output of said coincidence circuit means with said means for providing an output signal includes time delay means for providing said first control signal only if and after a signal appears at said output of the coincidence circuit means for a time at least equal to the delay afforded by said time delay means.

7. A control circuit according to claim 6, wherein means are provided for selectably bypassing said time delay means.

8. A control circuit according to claim 6, wherein a timing circuit is provided for preventing the production of an output signal for a predetermined time interval after energizing voltage is applied or interrupted to the control circuit.

9. A control circuit according to claim 2, wherein a timing circuit is provided for preventing the production of an output signal for a predetermined time interval after energizing voltage is applied or interrupted to the control circuit.

10. A frequency responsive control circuit comprising in combination means for converting an input signal of variable frequency into a variable voltage signal with the voltage varying as a function of the departure of the frequency of said input signal from a given reference frequency, means responsive to said voltage signal for providing a control signal which is a function of the sum of the instantaneous magnitude of said voltage signal and the first derivative thereof, and means responsive to said control signal for providing an output signal when said control signal exceeds a predetermined magnitude.

11. A control circuit according to claim 10, wherein said converting means comprises in combination, means responsive to said input signal for providing an auxiliary signal shifted in phase an amount proportional to said departure of the frequency of said input signal from said reference frequency, and means for comparing said auxiliary signal with said input signal to provide said voltage signal proportional to said phase shift.

12. A control circuit according to claim 11, wherein said means for providing said auxiliary signal comprises a band-pass filter having a center frequency equal to said reference frequency, and means for passing said input signal through said filter to provide said auxiliary signal.

13. A control circuit according to claim 12, wherein said input signal is sinusoidal, and wherein there are provided means for converting said sinusoidal input signal to a square wave signal of like frequency, means for passing said square wave signal through said filter, said auxiliary signal being sinusoidal as it leaves said filter, means for providing a gating signal during at least a portion of each half cycle of given polarity of said auxiliary sinusoidal signal commencing with the instant said auxiliary sinusoidal signal passes through zero, and coincidence means responsive to both said gating signal and said square wave signal for providing an intermediate signal having a parameter proportional to the time overlap between said gating signal and each half cycle of said square wave signal corresponding to the half cycles of said auxiliary signal which are of opposite polarity to said given polarity.

14. A control circuit according to claim 13, wherein said intermediate signal consists of spaced pulses and said parameter is the width of each of said pulses, means are provided for converting the variable width pulses of said intermediate signal to variable amplitude pulses of corresponding amplitude, and peak-detecting means are provided for converting said variable amplitude pulses to said variable voltage signal.

15. A frequency-responsive circuit for converting an input signal of variable frequency into a variable voltage signal with the voltage varying as a function of the departure of the frequency of said input signal from a given reference frequency, said circuit comprising in combination means responsive to said input signal for providing an auxiliary signal shifted in phase an amount proportional to said departure of the frequency of said input signal from said reference frequency, and means for comparing said auxiliary signal with said input signal to provide said voltage signal proportional to said phase shift.

16. A circuit according to claim 15, wherein said means for providing said auxiliary signal comprises a band-pass filter having a center frequency equal to said reference frequency, and means for passing said input signal through said filter to provide said auxiliary signal.

17. A circuit according to claim 16, wherein said input signal is sinusoidal, and wherein there are provided means for converting said sinusoidal input signal to a square wave signal of like frequency, means for passing said square wave signal through said filter, said auxiliary signal being sinusoidal as it leaves said filter, means for providing a gating signal during at least a portion of each half cycle of given polarity of said auxiliary sinusoidal signal commencing with the instant said auxiliary sinusoidal signal passes through zero, and coincidence means responsive to both said gating signal and said square wave signal for providing an intermediate signal having a parameter proportional to the time overlap between said gating signal and each half cycle of said square wave signal corresponding to the half cycles of said auxiliary signal which are of opposite polarity to said given polarity.

18. A circuit according to claim 17, wherein said intermediate signal consists of spaced pulses and said parameter is the width of each of said pulses, means are provided for converting the variable width pulses of said intermediate signal to variable amplitude pulses of corresponding amplitude, and peak-detecting means are provided for converting said variable amplitude pulses to said variable voltage signal.

19. A frequency-responsive control circuit for a load-shedding system of an electric power network comprising in combination means responsive to a drop in frequency of the voltage in said power network for providing a relay tripping signal, said means including means for determining the frequency below which said tripping signal is produced, means for advancing the frequency at which said tripping signal is produced as a function of the rate of decrease of said frequency, means for inhibiting the production of said tripping signal when said frequency exceeds a selected magnitude, and means for preventing the production of said tripping signal until the conditions for its production prevail for at least a predetermined interval.

PO-1050
(5/69)

UNITED STATES PATENT OFFICE
CERTIFICATE OF CORRECTION

Patent No. 3,564,275      Dated February 16, 1971

Inventor(s) Edwin R. Eberle and Charles J. Durkin, Jr.

It is certified that error appears in the above-identified patent and that said Letters Patent are hereby corrected as shown below:

Col. 5, line 29, after "electrode" and before "of" correct numeral "184" to --185--

Col. 6, line 14, last numeral "65" should be --67--;
     line 15, before sentence beginning "The junction 2 insert the following --The base electrode 237 of transistor 232 is connected th resistors 238 and 239 in series to the positive bus 65.--

Col. 6, line 22, after "electrode" correct numeral "146" t --246--

Col. 11, line 43, after "said" correct spelling of --first

Signed and sealed this 13th day of July 1971.

(SEAL)
Attest:

EDWARD M. FLETCHER, JR.
Attesting Officer

WILLIAM E. SCHUYLER, JR.
Commissioner of Patents